(No Model.)

H. AYRES.
GRIPPER FOR PRINTING PRESSES.

No. 274,546. Patented Mar. 27, 1883.

WITNESSES:
A. P. Grant
L. Douville

INVENTOR:
Henry Ayres
BY John A. Wiedersheim
ATTORNEY.

UNITED STATES PATENT OFFICE.

HENRY AYRES, OF PHILADELPHIA, PENNSYLVANIA.

GRIPPER FOR PRINTING-PRESSES.

SPECIFICATION forming part of Letters Patent No. 274,546, dated March 27, 1883.

Application filed October 9, 1882. (No model.)

*To all whom it may concern:*

Be it known that I, HENRY AYRES, a citizen of the United States, residing in the city and county of Philadelphia, State of Pennsylvania, have invented a new and useful Improvement in Grippers for Printing-Presses, which improvement is fully set forth in the following specification and accompanying drawings, in which—

Figure 1:
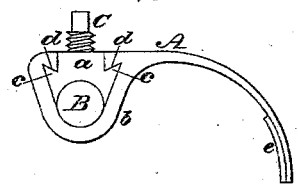
Figure 2:
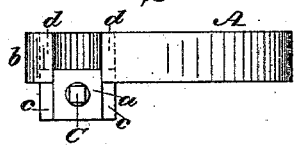
Figure 3:
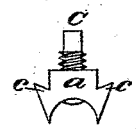
Figure 3:
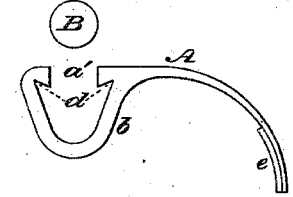

Figure 1 is a side elevation of the gripper embodying my invention. Fig. 2 is a top or plan view thereof. Fig. 3 is a side elevation thereof, the parts being separated.

Similar letters of reference indicate corresponding parts in the several figures.

My invention consists of a gripper so constructed that it may be removed without disturbing its shaft and other parts connected therewith.

Referring to the drawings, A represents a gripper, and B the shaft to which it is affixed. The hub or boss portion of the gripper is formed of two parts or sections, $a$ $b$, the inner faces thereof forming the opening through which the shaft B is passed. The two sections $a$ $b$ are separable from each other, and are fitted together by means of a tongue, $c$, which is formed with one section and engages with a groove, $d$, in the other section, said tongue and groove interlocking and extending parallel with the shaft B, whereby the sections may be connected and disconnected by lateral motions. The section $a$ is provided with a screw, C, which tightens against the shaft B for firmly connecting the gripper with said shaft, and the end of the gripper may be clad with leather, felt, &c., at its end, as at $e$, for purposes usual in such cases.

When the gripper is secured to the shaft B by means of the screw C its operation is similar to grippers in use. Should, however, the gripper break, be fractured, or for other causes require to be removed, the screw C is loosened and either section $a$ or $b$ moved laterally, or in a plane parallel with the shaft B, whereby said section is disconnected from the other section of the boss or hub, and the latter section may be moved out from the shaft by a motion at a right angle thereto, entirely clear thereof, thus fully removing the gripper from the shaft, it being noticed that when the sections are disconnected the throat $a'$, previously occupied by the section $a$, is sufficiently large to permit the passage of the shaft as it leaves the opening in the hub.

When the gripper is to be applied in position it is fitted through the throat $a'$ on the shaft B to full extent. The section $a$ is then connected with the section $b$ by the lateral motion, the tongue and groove $c$ $d$ engaging, and the two sections interlocking as one. The screw C is tightened, and the gripper is thereby securely and reliably held in position on the shaft, it being noticed that the tongue and groove interlocking, and, furthermore, secured by the action of the screw C, prevent the displacement of the section $a$, either in the direction parallel with or at a right angle to the shaft. It will also be seen that when a gripper is broken or injured the broken or injured part or section may be replaced, and the part remaining intact may be reused and connected with the replaced part or section.

The tongue and groove $c$ $d$ may be formed vertically on the inner sides of the sections $a$ $b$, or at a right angle to the shaft B, in which case a screw is passed through each side of the section $b$, so as to tighten against the section $a$, and the gripper is applied to and removed from the shaft in a direction at a right angle thereto.

Having thus described my invention, what I claim as new, and desire to secure by Letters Patent, is—

1. A gripper formed of sections detachably connected and clamping the shaft between them, substantially as and for the purpose set forth.

2. A gripper formed of separable sections provided with a tongue and groove, and laterally detachable from each other, substantially as and for the purpose set forth.

3. The gripper having separable sections and a connecting-screw, whereby both of them are held against the shaft, substantially as and for the purpose set forth.

HENRY AYRES.

Witnesses:
JOHN A. WIEDERSHEIM,
A. P. GRANT.